(12) United States Patent
Lin et al.

(10) Patent No.: US 7,162,112 B2
(45) Date of Patent: Jan. 9, 2007

(54) MICROFABRICATION PROCESS FOR CONTROL OF WAVEGUIDE GAP SIZE

(75) Inventors: Pinyen Lin, Rochester, NY (US); Joel A. Kubby, Rochester, NY (US); Yao Rong Wang, Webster, NY (US)

(73) Assignee: Xerox Corporation, Stamford, CT (US)

( * ) Notice: Subject to any disclaimer, the term of this patent is extended or adjusted under 35 U.S.C. 154(b) by 240 days.

(21) Appl. No.: 10/995,965

(22) Filed: Nov. 23, 2004

(65) Prior Publication Data

US 2006/0110101 A1    May 25, 2006

(51) Int. Cl.
G02B 6/12 (2006.01)
G02B 6/10 (2006.01)
G02B 6/00 (2006.01)
H01L 21/00 (2006.01)

(52) U.S. Cl. ............... 385/14; 385/129; 385/130; 385/131; 385/141; 438/29; 438/31; 438/33; 438/27; 438/26

(58) Field of Classification Search ............... 385/14
See application file for complete search history.

(56) References Cited

U.S. PATENT DOCUMENTS

| | | |
|---|---|---|
| 5,578,976 A | 11/1996 | Yao |
| 5,619,061 A | 4/1997 | Goldsmith et al. |
| 5,638,946 A | 6/1997 | Zavracky |
| 6,078,717 A | 6/2000 | Nashimoto et al. |
| 6,229,683 B1 | 5/2001 | Goodwin-Johansson |
| 6,307,996 B1 | 10/2001 | Nashimoto et al. |
| 6,320,994 B1 | 11/2001 | Donald et al. |
| 6,362,512 B1 | 3/2002 | Kubby et al. |
| 6,379,989 B1 | 4/2002 | Kubby et al. |
| 6,470,125 B1 | 10/2002 | Nashimoto et al. |
| 6,506,620 B1 | 1/2003 | Scharf et al. |
| 6,529,667 B1 | 3/2003 | Nashimoto |
| 6,580,858 B1 | 6/2003 | Chen et al. |
| 6,658,179 B1 | 12/2003 | Kubby et al. |
| 6,664,707 B1 | 12/2003 | Jerman et al. |
| RE38,437 E | 2/2004 | Floyd et al. |
| 6,744,338 B1 | 6/2004 | Nikitin |
| 6,744,951 B1 | 6/2004 | Dawes et al. |
| 6,754,472 B1 | 6/2004 | Williams et al. |
| 6,801,679 B1 * | 10/2004 | Koh et al. ............ 385/14 |
| 2002/0168144 A1 | 11/2002 | Chen et al. |
| 2003/0086641 A1 | 5/2003 | Kubby et al. |
| 2003/0102936 A1 | 6/2003 | Schaefer |
| 2003/0210115 A1 | 11/2003 | Kubby et al. |
| 2004/0114856 A1 | 6/2004 | Kubby et al. |
| 2004/0118481 A1 | 6/2004 | Kubby et al. |

* cited by examiner

*Primary Examiner*—Frank G. Font
*Assistant Examiner*—Mary El-Shammaa
(74) *Attorney, Agent, or Firm*—Fay, Sharpe, Fagan, Minnich & McKee, LLP

(57) ABSTRACT

A method for forming a gap (16) of a width (d) which meets selected tolerance limits includes forming sidewalls (80, 82) in a microstructure, the sidewalls defining a gap (16) therebetween. The gap has a width defined between the sidewalls. The width of the gap between the sidewalls is determined. Where the determined width of the gap is below the selected tolerance limits for the width of the gap, the sidewalls are consumed to form a gap which meets the selected tolerance limits. The gap may be incorporated in a waveguide device (10) of a microswitch (100) and selectively connect input and output waveguides (130, 132).

25 Claims, 9 Drawing Sheets

US 7,162,112 B2

MICROFABRICATION PROCESS FOR CONTROL OF WAVEGUIDE GAP SIZE

BACKGROUND

The present exemplary embodiment relates to a method of controlling the width of a gap in an optical element. It finds particular application in conjunction with control of a waveguide gap width for minimizing optical transmission loss, and will be described with particular reference thereto. However, it is to be appreciated that the present exemplary embodiment is also amenable to other like applications.

Optical communication components, which use light waves and beams to carry information, are widely used in the telecommunications industry. Many optical components employ waveguides to convey the optical signals. The fabrication of waveguides in silica typically includes forming a core layer, which is primarily $SiO_2$ doped with another material, such as Ge or $TiO_2$. A cladding layer is formed on the core layer, such as $SiO_2$, doped with another material, such as $B_2O_3$ and/or $P_2O_5$, in which the waveguides are formed. A trench is etched through the waveguide and into the silicon substrate.

Processing technologies for forming micro-electromechanical system (MEMS) devices include bulk micromachining of single crystal silicon and surface micromachining of polycrystalline silicon. Bulk micromachining of single crystal silicon typically utilizes wet anisotropic wet etching. The etch rate can be modified by the incorporation of dopant atoms, such as boron, which substitute for silicon atoms in the crystal lattice. Deep Reactive Ion Etching (DRIE) utilizes sidewall passivation and ion beam directionality to achieve etch anisotropy. Surface micromachining of polycrystalline silicon typically utilizes chemical vapor deposition (CVD) and reactive ion etching (RIE) patterning techniques to form mechanical elements from stacked layers of thin films Commonly, CVD polysilicon is used to form the mechanical elements, CVD nitride is used to form electrical insulators, and CVD oxide is used as a sacrificial layer. Removal of the oxide by wet or dry etching releases the polysilicon thin film structures.

Optical switches are examples of MEMS devices and are used in optical fiber transmission networks to route optical signals along various signal paths. A MEMS shuttle switch employs two waveguide gaps while a cantilever switch uses one gap. A light signal traveling down one stationary waveguide is transmitted into another stationary waveguide via the gap. Switches of this type are disclosed, for example, in U.S. Pat. Nos. 5,578,976 to Yao; 5,619,061 to Goldsmith et al.; 5,638,946 to Zavracky; and 6,229,683 to Goodwin-Johansson, which are incorporated herein by reference in their entireties. These switches are typically configured as a cantilever or suspended mass structure and have a switch contact that moves in a generally perpendicular direction with respect to the plane of the substrate on which the device is fabricated or laterally thereto.

Waveguide gaps are generally filled with air, although other optical media have been employed. U.S. Pat. No. 6,744,951 to Dawes, for example, discloses a method of coupling optical waveguides separated by a gap of about 2–500 µm which includes filling the gap with a photopolymerizable composition and curing the composition with photo-radiation passing through the waveguides.

Destructive interference due to the formation of a Fabry-Perot cavity may occur within an optically transparent medium such as a waveguide gap. The destructive interference attenuates the laser energy flux through the optically transparent medium. Optical losses due to the waveguide gaps in such devices may make a significant contribution of the overall transmission loss of the system.

BRIEF DESCRIPTION

In accordance with one aspect of the present embodiment, a method for forming a gap is provided. The method includes forming sidewalls in a microstructure with a gap therebetween, the gap having a width between the sidewalls. The width of the gap between the sidewalls is determined. Where the determined width of the gap is below selected tolerance limits for the width of the gap, at least one of the sidewalls is consumed to form a gap which meets the selected tolerance limits.

In accordance with another aspect of the present embodiment, a method of forming a waveguide device for transmission of an optical signal is provided. The method includes forming sidewalls in a microstructure, the sidewalls defining a gap therebetween. The gap has a width which is defined by the expression: $d = d_R \pm 0.5[\lambda/4]$, where d is the width, $d_R$ is a width of a gap at which transmission losses of the optical signal are at a minimum.

In accordance with another aspect of the present exemplary embodiment, a waveguide device is provided. The device includes a microstructure with a gap, the gap having a width d, the width having been determined to meet the expression:

$$d = d_R \pm 0.5[\lambda/4],$$

where d is the gap width, $d_R$ is a width of a gap at which transmission losses of an optical signal of wavelength $\lambda$ passing across the gap are at a minimum.

DETAILED DESCRIPTION

One aspect of the present disclosure is directed to a microfabrication process. The process is suitable for forming MEMS devices and enables accurate control of a waveguide gap width between waveguide elements such that the Fabry-Perot effect can be used to minimize transmission losses. Where reference is made herein to transmission loss, and reductions in transmission loss, it is the transmission loss which is a function of the waveguide gap width, rather than other transmission losses in an optical system, which is being considered, unless otherwise specified. These gap width-related losses may be referred to herein as Fabry-Perot losses.

In one aspect, the disclosure is directed to a method for forming a gap in a microstructure of a width which meets selected tolerance limits. The tolerance limits can be selected to reduce transmission losses which may occur due to destructive interference between an optical signal passing across the gap and sidewalls of the gap. The method includes forming a trench in a layer of a microstructure. The trench may have a length which extends between ends of the microstructure and a width defined between sidewalls of waveguide elements of the microstructure. The width of the trench formed in this step can meet the tolerance limits or be less than the desired width of the gap (i.e., falling outside the tolerance limits). The width of the trench is determined and, where the determined width of the trench is below the selected tolerance limits for the width of the gap, the sidewalls are consumed to increase the width of the trench and thereby form a gap meeting the preselected tolerance limits.

The method is suited to the formation of a waveguide device which serves as a bridging gap between one or more input waveguides and one or more output waveguides, such as optical fibers. The waveguide device may include a plurality of waveguide gaps, in the form of trenches, each of the trenches meeting the prescribed tolerance limits. The waveguide device may serve as a component of an optical switch in which the waveguide device is translated to align different ones of the input and output channels with the waveguide gap, whereby different one(s) of the input channels are selectively connected with different one(s) of the output channels.

Figure 1:
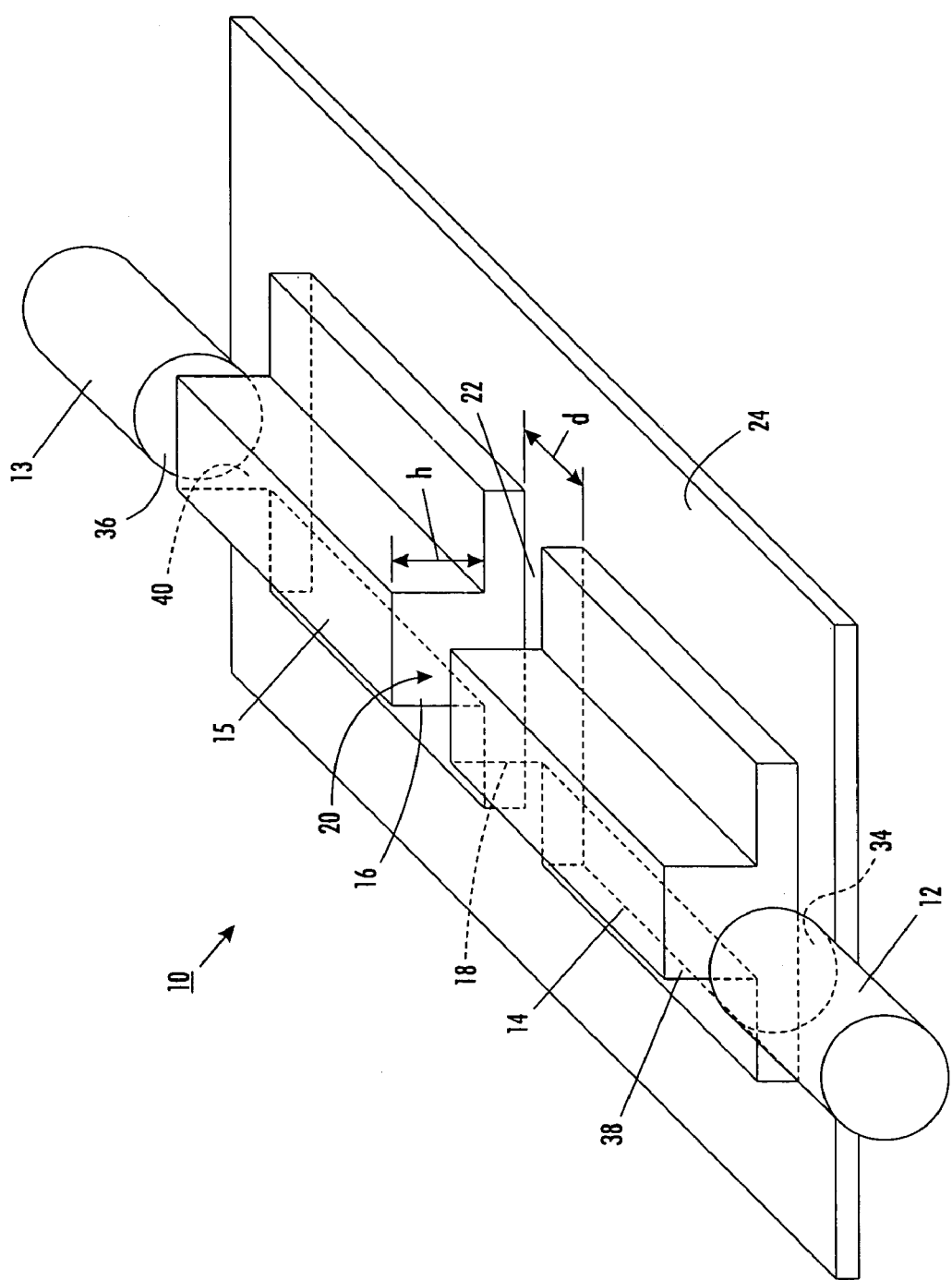
FIG. 1 is an exploded perspective view of a waveguide device and associated input and output waveguides according to a first embodiment of the disclosure.

With reference to FIG. 1, an exemplary optical waveguide device 10 is shown. The waveguide device 10 is capable of being selectively coupled with stationary input and output channels 12, 13, such as optical fibers. The waveguide device 10 includes first and second waveguide elements 14, 15, spaced by a gap 16 which can serve as a connection between the waveguide elements 14, 15. The gap 16 has a gap width d between opposed ends 18, 20 of the waveguide elements 14, 15 of the device 10. The gap 16 is defined by a floor 22 comprising an upper surface of a planar substrate 24 upon which the waveguide elements 14, 15 are supported, and sidewalls 18, 20 at the opposed ends of the waveguide elements. The sidewalls 18, 20 can be in the form of planar, generally parallel facets, which tend to reflect the optical signal passing across the gap. An optically transmissive medium, such as air, fills the gap 16. The waveguide device 10 can be used for transmitting a signal between the optical fibers and may form a component of an optical switch. Ends 34, 36 of the optical fibers 12, 13, respectively, have smooth surfaces which may be aligned with respective ends 38, 40 of the waveguide elements 14, 15. When the waveguide device 10 is positioned so that the channel is aligned with the input and output channels 12, 13, an optical signal enters the first waveguide element 14 from the input channel 12, passes therethrough, crosses the gap from the first end 18 to the second end 20, enters the second waveguide element 15, passes therethrough and enters the output channel 13. It will be appreciated that while the waveguide elements 14, 15 are shown as linear, between ends 18, 38 and 20, 40, the waveguide elements may be curved or otherwise shaped such that the end 18 is offset from end 38 and end 20 is offset from end 40.

By moving, e.g., rotating or translating the waveguide element 14, relative to the substrate 24, the facet 18 can be brought into alignment with a facet of a third waveguide element (not shown), thereby allowing the transfer of optical signals between input channel 12 and a second output channel (not shown).

While particular reference is made to the transmission of optical signals such as laser light waves, for carrying telecommunication signals between fiber optic cables via a fluid medium in the waveguide channel, such as air, it will be appreciated that other electromagnetic signals and transmission media are also contemplated and that the channel may have other uses than the transmission of signals.

In a typical MEMS device, such as a shuttle switch, the desired gap width d is generally only about a few microns, e.g., about 2 µm. The wavelength of the optical signal is generally such that the interference effect of the light due to multiple scattering at the gap is significant. The width d of the gap can be chosen to minimize the transmission loss. In telecommunications, for example, the wavelength of the optical signal is typically about 1.30 or 1.55 µm. The gap width d of the channel 16 is controlled, during formation, to reduce transmission losses. For example, for a wavelength of about 1.55 µm, the width d of the gap, in air, may be controlled to within about ±0.2 µm, or less of an optimum width, at which transmission losses are a minimum, and in one embodiment, to within about 0.15 µm, or less of the optimum width. For a wavelength of about 1.3 µm, the width d of the gap, in air, may be controlled to within about ±0.16 µm.

To form the gap 16, a via or trench of approximately the desired gap width is created in a microstructure, such as a silicon-based microstructure, using suitable etching techniques. The width of the trench created is then determined. Sidewalls of the trench are then consumed, for example by thermal oxidation and subsequent removal of the oxide or by wet etching of the silicon, to increase the width of the trench until a desired gap width is achieved. The method provides a reliable technique for submicron adjustment of silicon thickness.

Without intending to limit the scope of the disclosure, the following theoretical considerations provide a method for determining an optimal width of the gap 16. For a gap width d between two parallel, identical large planes 18, 20 with reflectivity R, the transmission coefficient T is given by the expression:

$$T = \left[1 + \frac{4R\sin^2 kd}{(1-R)^2}\right]^{-1} \quad (1)$$

where k is the wave vector of the light. The wave vector is defined as $2\pi/\lambda$, where $\lambda$ is the wavelength. T is a maximum when $\sin(kd)=0$. The Fabry-Perot resonance condition is thus:

$$d_R = m\lambda/2 \quad (2)$$

where $d_R$ is the resonant gap value, m is an integer, i.e., m=1, 2, 3 . . . etc., and λ is the wavelength of the light. For example, m can be an integer between 1 and 20. For λ=1.55 µm, the resonant gap values $d_R$ are 0.775 µm, 1.55 µm, 2.325 µm, 3.1 µm, 3.875 µm, 4.65 µm, etc. The value of m selected generally depends on the width of the gap. In general, the value of m is as small as reasonably possible since larger gap widths tend to increase optical losses.

Figure 2:
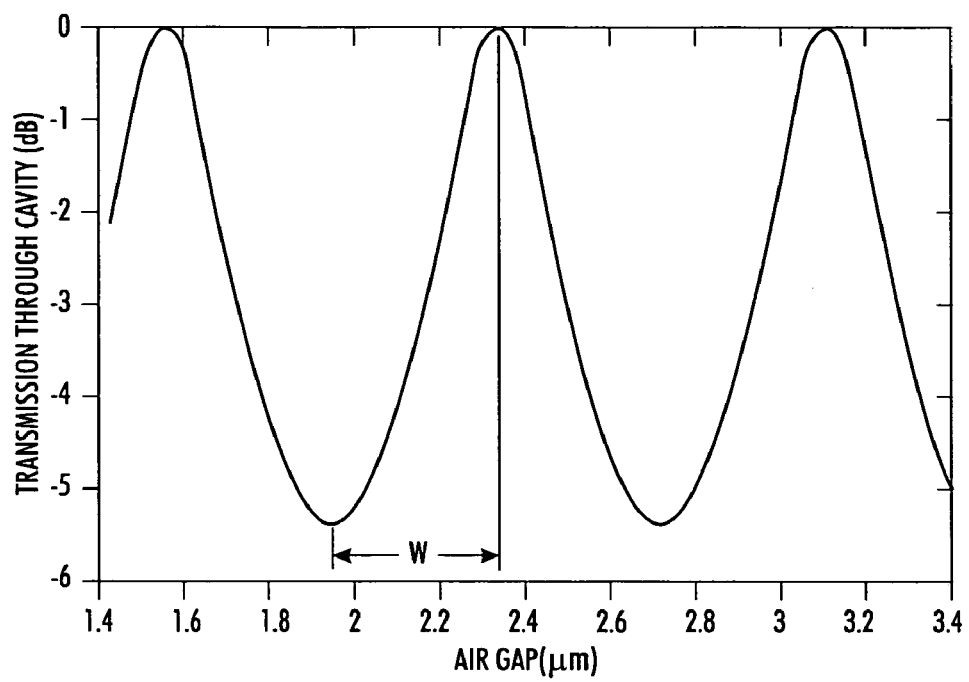
FIG. 2 is a simulated plot of transmission coefficient as a function of the air gap width between two vertical silicon planes.

FIG. 2 shows the transmission coefficient of a gap between two vertical silicon planes 18, 20 as a function of gap size d. The transmission coefficient is expressed in dB, where dB=10 $\log_{10}T$, and is at its highest theoretical value of 0, i.e., no transmission loss, at the resonance conditions where d=$d_R$. It can be seen that by selecting a gap width d which is at or close to the resonance condition, transmission losses are reduced.

The peak-to-valley distance w is the difference in gap width between adjacent highest and lowest transmission values. In order to control the width of the gap d to take advantage of the resonance condition, any fabrication method should be capable of forming a gap with a width which is $d_R$±x, where x<w. In one embodiment, x≦0.5w. The peak-to-valley distance w is λ/4, i.e., in this embodiment: x≦0.5[λ/4]. In one specific embodiment, x≦0.4w, i.e., x≦0.4[λ/4]. In another specific embodiment, x≦0.3[λ/4].

For transmissions of 1.55 µm wavelength, the peak-to-valley distance w is about 0.39 µm. In one specific embodiment, x≦0.2 µm and in another specific embodiment, x≦0.15 µm.

The above values assume ideal conditions, such as smoothness of the facets which define sidewalls 18, 20 of the gap having infinite height. In practice, the gap 16 is located between two waveguide elements 14, 15 with limited height h and imperfections, such as roughness at the facets, and the light passing through the gap has a finite wavelength bandwidth rather than being of a single wavelength. However, the selection of gap width accommodates minor perturbations of this type.

Figure 3:
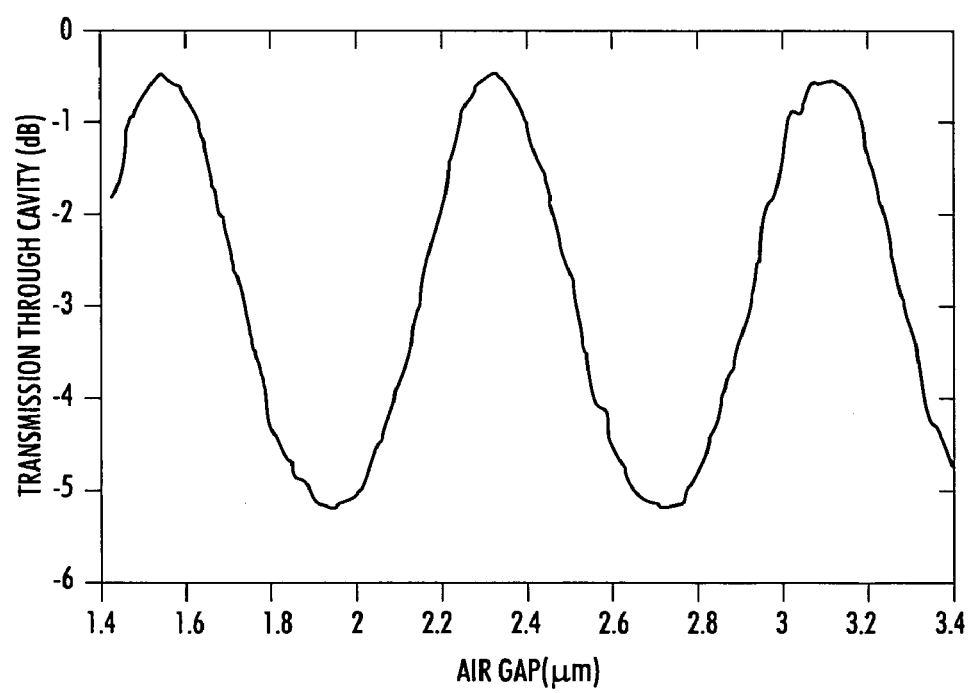
FIG. 3 is a simulated plot of transmission coefficient as a function of the air gap width for facet walls having a peak-to-valley roughness of 0.2 µm.

For example, where facet roughness occurs, there is inevitably some transmission loss, even at the highest transmission value. FIG. 3 shows the effect of facet roughness on the transmission coefficient, as a function of gap width d. The roughness is generated by randomly varying the gap size around the mean, and the transmission coefficient is averaged. The result indicates that the resonance condition given in Eqn. (2) holds with facet roughness, although the roughness introduces about a 0.5 dB loss at the peak.

Figure 4:
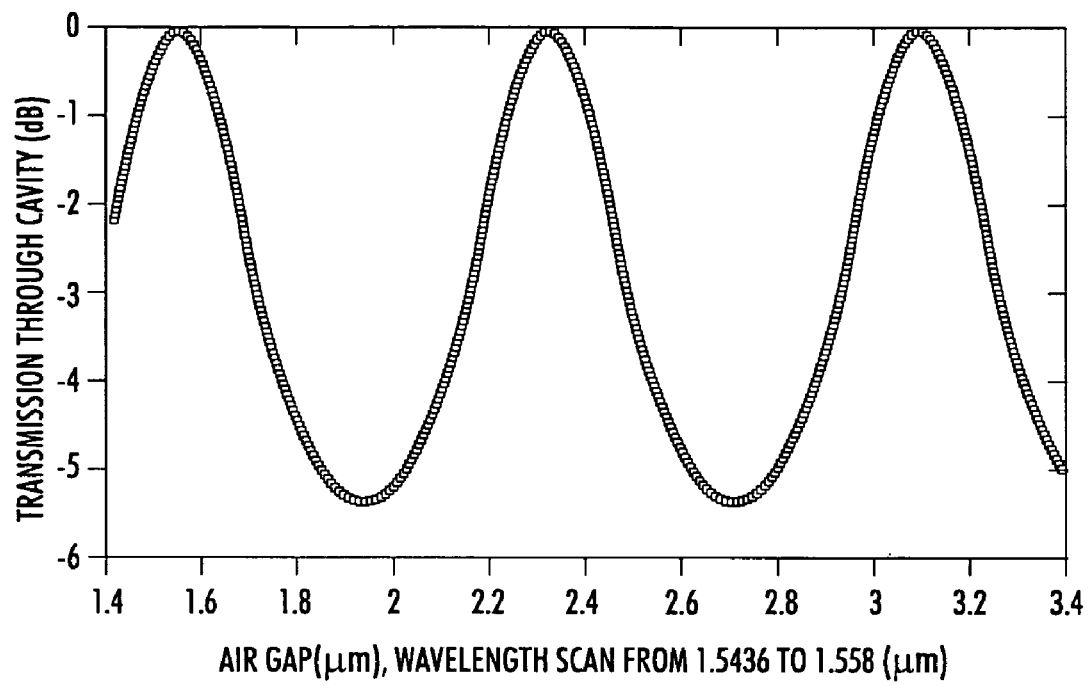
FIG. 4 is a simulated plot of transmission coefficient as a function of the air gap width for light-in the wavelength band 1.543 µm–1.558 µm.

Eqn. (2) also holds where the signal is over a relatively narrow band of wavelengths, referred to as multi-wavelength transmission. In a wavelength division/multiplexing (WDM) or dense wavelength division/multiplexing (DWDM) system, multi-wavelength light is transmitted. For example, in the 1.55 µm wavelength band, wavelengths varying from 1.543 µm to 1.558 µm are typically found, i.e., the wavelength band is about 1.55±0.0075. FIG. 4 shows the transmission coefficient calculated for this band. Clearly, a gap width designed according to Eq. (2) with λ selected as the center or mean wavelength will work for this band provided the variation is not too large. In one embodiment, the standard deviation of the wavelength variation is less than 1% λ/4, and in one specific embodiment, less than 0.4% λ/4. For example, where the mean wavelength is about 1.6 nm, the variation may be less than 10 nm.

Figure 5:
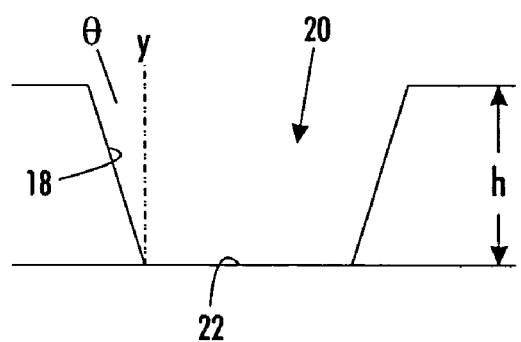
FIG. 5 is a side sectional view through a waveguide element according to a second embodiment of the disclosure.
Figure 6:
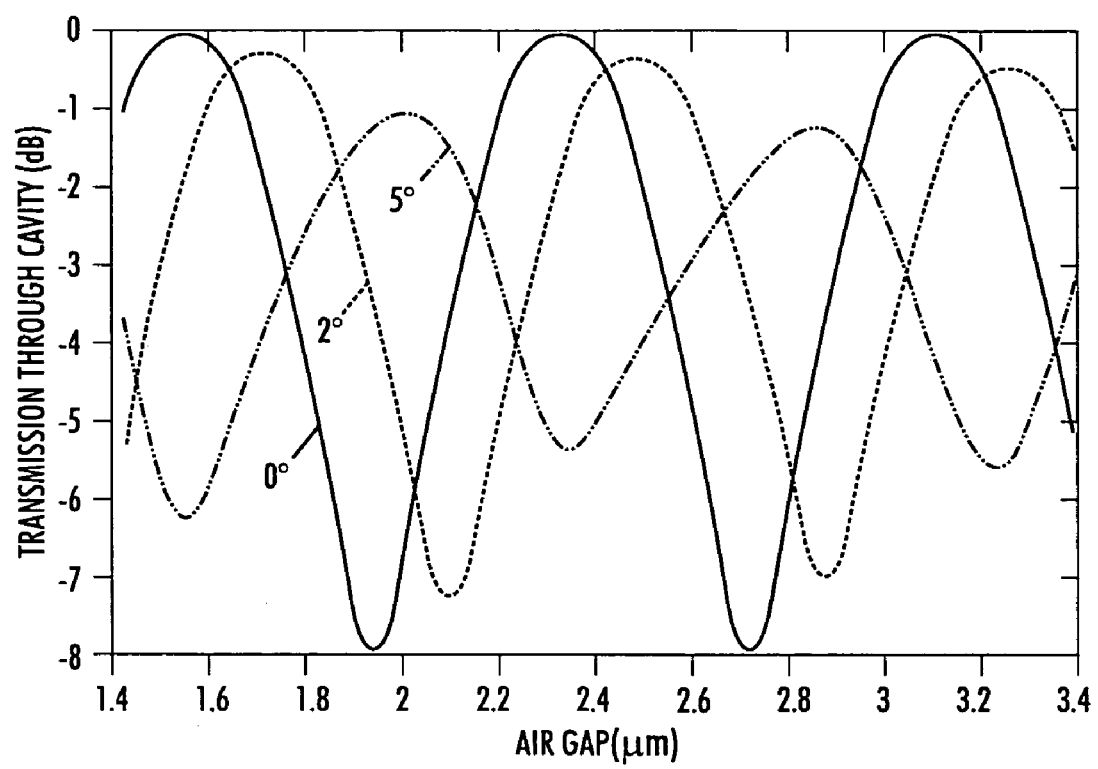
FIG. 6 is a simulated plot of transmission coefficient as a function of the air gap width for gap facet angles of 0°, 2°, and 5°.

In some fabrication processes, it may not be feasible to form the sidewalls of the gap exactly vertically. The gap facet angle θ (FIG. 5), defined as the angle between the facets 18, 20 and an axis y perpendicular to the gap floor 22, affects the values of $d_R$. However, knowing the gap facet angle θ, the effects on $d_R$ can be determined. FIG. 6 shows the transmission coefficient as a function of gap size and gap facet angle. The height h of the waveguide element in the simulation is 3 µm. It is clear from the simulation that the facet angle shifts $d_R$ by some value, depending on the facet angle, from the peak position given in Eq. (2). This is because the optical path length that causes the interference of the light from multi-scattering at the gap changes with the angle. To deal with this effect, it can either be eliminated or taken into account. For example, a fabrication process is selected that creates the gap facet vertically or as close to vertical as possible, in which case, the effect of facet angle is minimized or essentially eliminated. In one embodiment, θ is within about ±2° of vertical. Alternatively, a process is used which creates a facet with a known angle. The gap size can then be designed for the known angle using the simulation results as shown in FIG. 6. Where the facet angle is not zero, d is the mean width of the gap from the center of one facet 18 to the center of the opposite facet 20.

The effect of the height h of the gap on the optimum gap width is not significant, as long as h is substantially larger than the gap width and wavelength, e.g., at least twice the gap width.

Another factor which can affect the resonance value $d_R$ is the type of fluid filling in the gap. Eqn. (2) is derived for air as the fluid. To accommodate different fluids, the gap design rule of Eqn. (2) can be modified. Specifically, for a gap filled with a fluid or other light transmissive medium having a refractive index $n_f$, Eqn. (2) becomes:

$$d_R = m\lambda/(2n_f) \quad (3)$$

Figure 7:
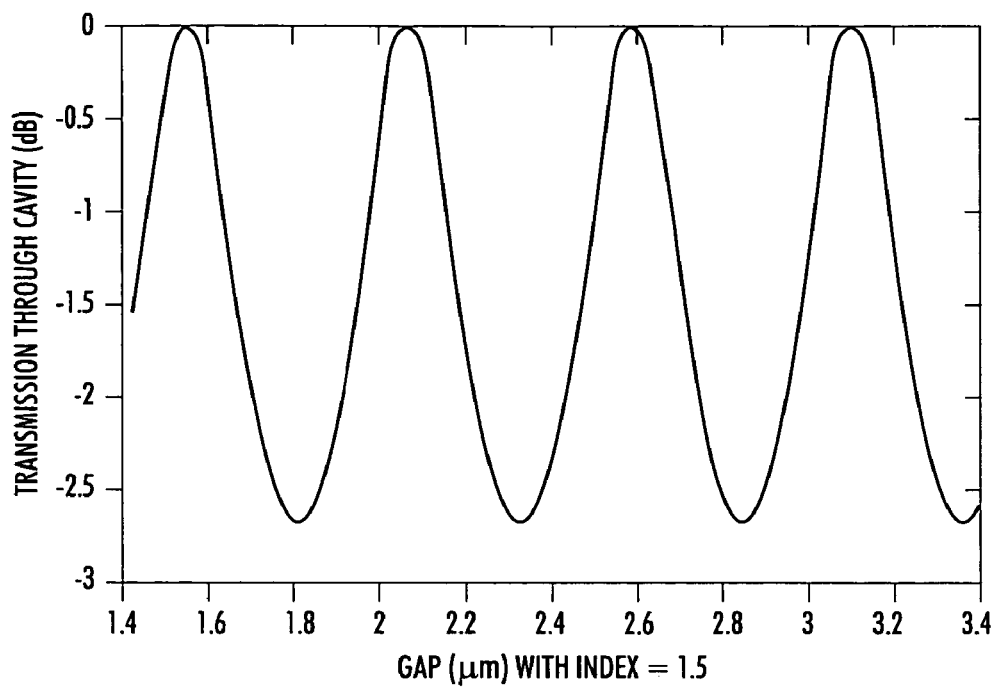
FIG. 7 is a simulated plot of transmission coefficient as a function of the gap width between two vertical silicon planes when the gap is filled with a fluid with $n_f = 1.5$.

FIG. 7 shows the transmission coefficient as a function of the gap size between two vertical silicon planes when the gap is filled with a fluid with $n_f$=1.5. Comparing FIG. 7 with FIG. 2, it can be seen that the fluid filling in the gap not only changes the resonant condition to Eqn. (3), but also reduces the magnitude of peak-to-valley variation in the transmission coefficient, as the reflectivity R is reduced as compared to an air-filled gap.

Figure 8:
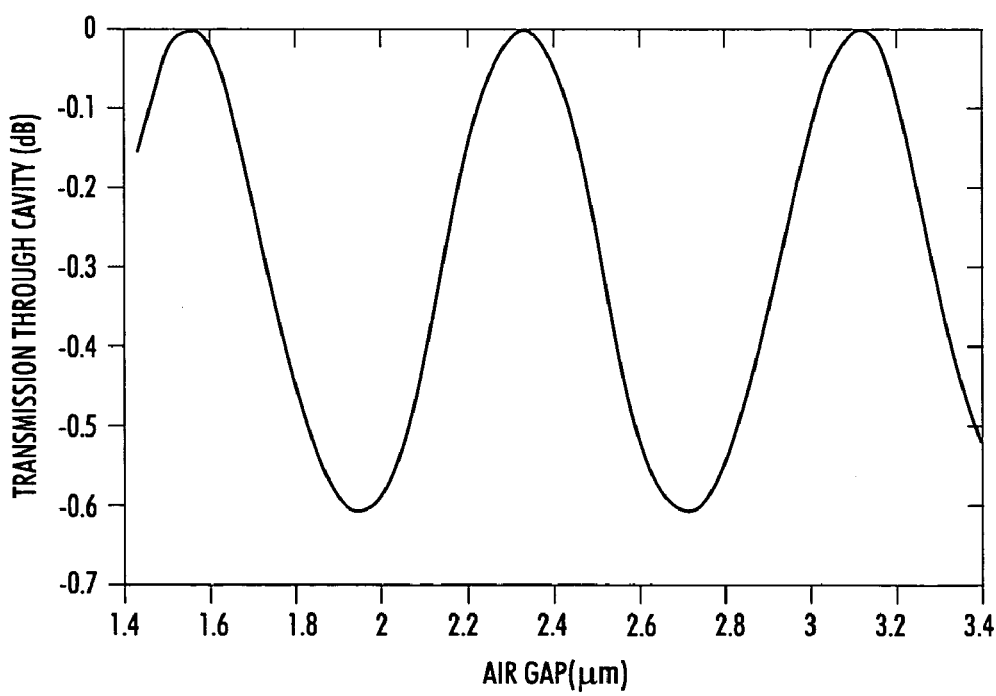
FIG. 8 is a simulated plot of transmission coefficient as a function of the gap width for a waveguide made of silica with refractive index=1.46.

The above simulations assume that the waveguide is made from silicon. Where the waveguide if formed from materials other than silicon, the reflectivity affects the transmission loss but does not change the resonant condition. Many optical waveguides in the telecommunication industry are not made of silicon, but of silica, InP, or the like. Eqns. (2) and (3) are still applicable, although the reflectivity R changes with the materials. FIG. 8 shows the transmission coefficient as a function of the gap size for waveguide device made of silica with refractive index $n_f$=1.46.

To accommodate variations in facet angle, optical medium in the gap, and wavelength (or mean wavelength) the waveguide gap width d can be defined by the general expression:

$$d_R = m\lambda/(2n_f) + c, \quad (4)$$

where λ is the wavelength of the optical signal, m is an integer, $n_f$ is a refractive index of an optical medium in the waveguide gap, and c is constant which is a function of the facet angle which is 0 when the walls of the gap are vertical.

For example, where d=$d_R$±0.5[λ/4], $$d = [m\lambda/(2n_f) + c] \pm 0.5[\lambda/4]$$

For convenience, c may be treated as 0 when the walls are substantially vertical (less than 0.5° from perpendicular to the substrate floor). For a facet angle θ of 2°, c=0.18μ, and for a facet angle θ of 5°, c=0.45μ.

In determining the appropriate tolerance limits for a waveguide gap, an approximate width of the gap desired is first determined. A real or simulated plot of transmission vs. gap width can be used to determine the optimal gap width or widths $d_R$ which fall within the desired range, or, if the value of c is known, $d_R$ can be determined from Eqn. (4). One of the values from the possible values of $d_R$ is then selected as the target gap width and the appropriate tolerance limits determined. For example, the microstructure specifications may call for a gap width which is between 3 and 4 μm. In the embodiment illustrated in FIG. 2, a gap width $d_R$ of 3.1 μm or 3.875 μm would meet this specification. If the value 3.875 μm is selected, the gap can be 3.875 μm±0.5[λ/4], e.g., for a 1.55 μm mean wavelength, the gap size may be within these tolerances if it is 3.875 μm±~0.2 μm, or, for lower transmission loss, 3.875 μm±0.15 μm. Depending on the accuracy of the fabrication techniques and gap measurement techniques available, even finer tolerances can be achieved.

The method allows Fabry-Perot losses to be reduced and/or controlled within predetermined limits. In one embodiment the Fabry-Perot losses of waveguide devices formed by the method is less than half the difference between the maximum and minimum values of the transmission coefficient (in dB) due to the Fabry-Perot effect and in one embodiment, less than 40%, and in a specific embodiment, less than 30%. For example, using the illustration of FIG. 2, where the maximum transmission coefficient is 0 dB and the minimum transmission coefficient is approximately −5.5 dB, the control of the gap width can ensure that the transmission coefficient due to Fabry-Perot losses is greater than −2.75, and in one embodiment, greater than −2.2, and in another embodiment, greater than −1.65 dB for all waveguide elements formed (or for a specified percentage of waveguides formed, e.g., at least 90% or at least 95%). Without the control of the waveguide width, a portion of the waveguide elements fabricated would automatically fall within the specified tolerances and thus have Fabry-Perot losses within these ranges. However, a larger portion of the waveguides formed would have Fabry-Perot losses which are greater than those which can be achieved when the width is controlled. Indeed, some of these waveguides formed would have Fabry-Perot losses at or close to the maximum values and thus perform significantly worse. The present method ensures that the Fabry-Perot transmission losses of waveguide elements formed by the method fall within a selected range and avoids formation of waveguide elements with Fabry-Perot losses at or close to the maximum.

As noted above, the peak-to-valley distance is λ/4. In the illustrated embodiment, where light of 1.55 μm mean wavelength is entering an air gap, and the peak-to-valley distance is about 0.39 microns, it is desirable to control the variation of the gap size to be less than ±0.15 micron to minimize the optical loss. Conventional MEMS fabrication techniques do not permit such accurate control of the gap width. For example, using a contact aligner and a 1.2 micron photoresist, it difficult if not impossible to achieve such tolerances.

The following fabrication method can amend the gap in the event of the gap width on the photoresist level being out of tolerance, such that the gap is within the specified tolerance, e.g., within ±0.2 μm of the desired width $d_R$. By utilizing a process which consumes sidewalls of a preformed gap, the sidewalls are brought within the desired tolerance.

First, a trench is formed in a substrate material by a suitable etching technique. The width of the gap is measured by a technique which is capable of distinguishing between those widths that are within tolerance and those which fall outside the specified tolerance. For example, if the tolerance range is ±0.15 microns, the measuring technique is capable of measuring widths to within about 0.1 microns, or less.

If the trench is within the specified tolerance for the waveguide gap, then no further amendment is necessary. If the width is substantially wider than the desired gap width and cannot be brought into the desired tolerance range by amendment, the component may be discarded. Accordingly, it may be beneficial to etch a trench which is likely to fall slightly less than the desired width to ensure that the desired gap size can be achieved.

Where the width of the trench is outside, but less than, the desired tolerance range, the width of the trench is amended to bring the width to within the desired tolerance range.

Figure 12:
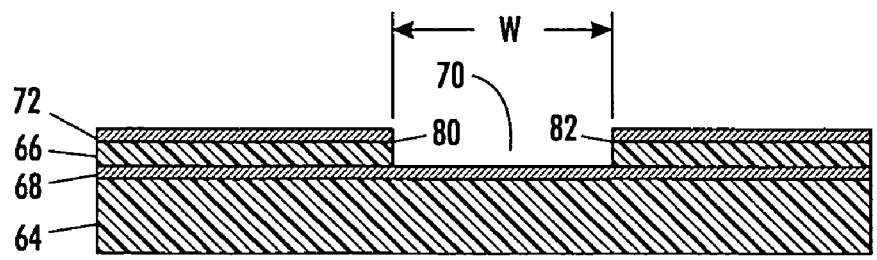
Figure 13:
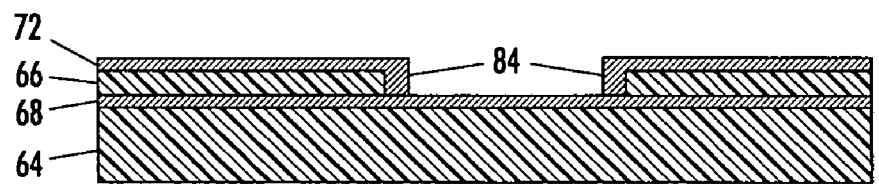

The process for forming the trench is not critical and will depend, to some degree on the materials used. FIGS. 9–15 illustrate exemplary steps in the formation of a typical microstructure 60 that can be fabricated, starting with a silicon-on-insulator structure 62 shown in FIG. 9. The structure 62 includes a substrate 64, in the form of a silicon wafer, a layer 66 in which the waveguide elements are to be defined, such as a single-crystal-silicon (SCS), silica, InP, or the like, with an insulator layer 68, such as a buried oxide (BOX) layer, therebetween. The BOX layer 68 integrally bonds the SCS layer to the substrate layer 64. This buried oxide layer can also be used as an etch stop in wet and dry etching procedures. The SCS layer 66 is etched to form a trench 70 (FIG. 12). In the illustrated embodiment, a mask layer 72 suitable for deep reactive ion etching (DRIE) of the underlying SCS layer and a photoresist layer 74 complete the microstructure 62. Suitable materials for the mask layer include silicon oxides and nitrides.

To start the process, silicon-on-insulator (SOI) wafers are used. The SOI wafers contain a layer 66 of single-crystal-silicon (SCS) of about 2–10 μm thickness on a surface 76 of the BOX layer 68, which is on top of the bulk silicon, layer 64 (FIG. 9).

A mask layer 72 is formed on a surface 78 of the SCS layer 66. For example, silicon oxide is formed by plasma enhanced chemical vapor deposition (PECVD), low pressure chemical vapor deposition (LPCVD), or a thermally grown oxide is formed. The mask layer 72 can also be silicon nitride, which can be deposited using LPCVD or PECVD.

Figure 9:
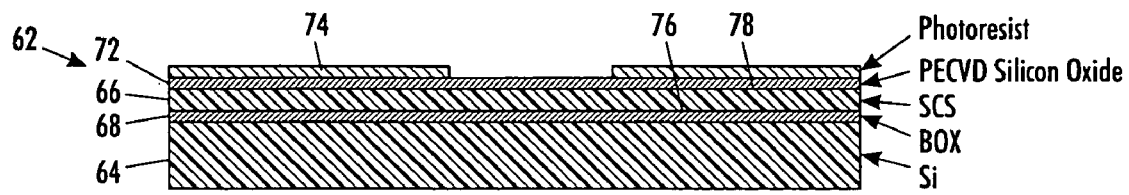
FIGS. 9–15 show fabrication steps in a process for waveguide gap size control.

A photoresist layer 74 is deposited on the PECVD oxide and patterned using a lithographic process to define opposed waveguide elements, as shown in FIG. 9.

Figure 10:
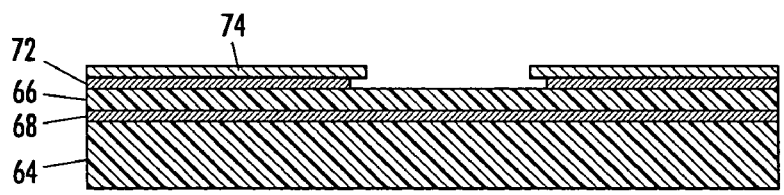
Figure 11:
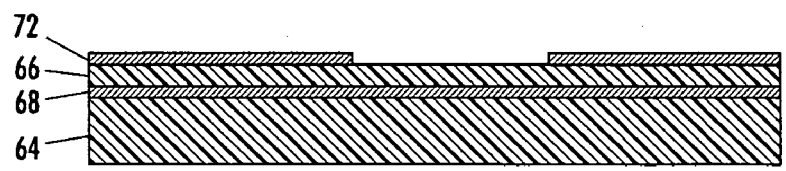

After patterning the photoresist, the layer 72 is etched as shown in FIG. 10. A wet etching method (such as buffered HF solution) or a dry etching method (such as reactive ion etching) can be used to etch silicon oxide. A wet or dry etching method can be used for etching silicon nitride.

The photoresist layer 74 is then removed (FIG. 11) and the layer 66 etched through the oxide or nitride mask layer 72 using DRIE (FIG. 12).

The oxide opening width w is measured. This can be carried out using a grating, for example, by positioning a designed chromium (Cr) pattern having a number of equally spaced patterned lines, for example 0.05 μm or 0.1 μm apart, on the mask 72. To form the Cr pattern, chromium is deposited, by a suitable sputtering method, on a transparent substrate, such as glass, and the deposited chromium layer is etched by a photolithographic method, to form the chromium pattern. The Cr pattern serves as a ruler. For example, one of the lines in the Cr pattern is aligned with one waveguide and the width to the other waveguide measured by determining the number of lines. Alternatively, the Cr pattern can have fixed widths with 0.1 micron increments. For example, the Cr pattern has patterns which are 1.1, 1.2, 1.3, etc. microns in width. Patterns can be aligned, in turn, with the gap to find the pattern or patterns having a width closest to that of the gap width. The gap width is then estimated. Alternatively, a critical dimension scanning electron microscope (CD SEM), or other suitable measuring device, is used to measure the width w to within an accuracy of about 0.1 microns, or less.

Figure 14:
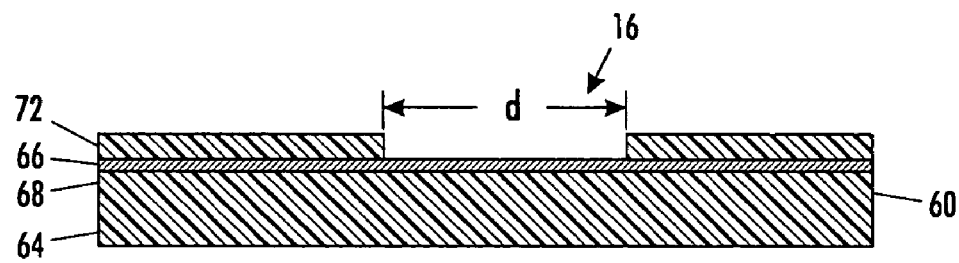

If the oxide opening w is not within the specified tolerance range for the gap width d, the width w is increased. In one embodiment, this step employs a method which allows a controlled, relatively slow removal of the sidewalls 80, 82 of the trench 70, until the final width of the gap is within specification. Where the rate of consumption of the sidewalls is known or can be determined, it is not necessary to remeasure the gap throughout or subsequent to the removal step. One method for consuming the sidewalls at a slow, reproducible rate is by thermal oxidation (FIG. 13) followed by removal of the grown oxide. In this method, the microstructure is exposed to oxygen or air in a furnace at temperatures suitable for slow oxide growth, e.g., 900° C. to 1100° C. This results in a gradual oxidation of sidewall material at a controlled rate, e.g., about 0.1–0.5 μm removal of silicon/hr, such as a rate of about 0.2 μm removal/hr. The rate of oxidation can be determined by tests on samples at the selected temperature so that for any given gap width increase, the oxidation time can be predetermined. The thermal oxide layer 84 thus grown is then removed using a suitable etchant, such as HF solution. The oxidation conditions are selected to consume the silicon so that the gap size is within, e.g., ±0.15 μm of the desired distance. FIG. 14 shows the final microstructure 60 after removing the patterning mask of DRIE 72. This can be removed in the HF or buffered HF used to remove the oxide. The microstructure can be utilized directly as the waveguide element 10 or other layers and/or components added.

While it is convenient to oxidize both sidewalls at the same time, it is also contemplated that only one of the sidewalls may be oxidized and removed.

Figure 15:
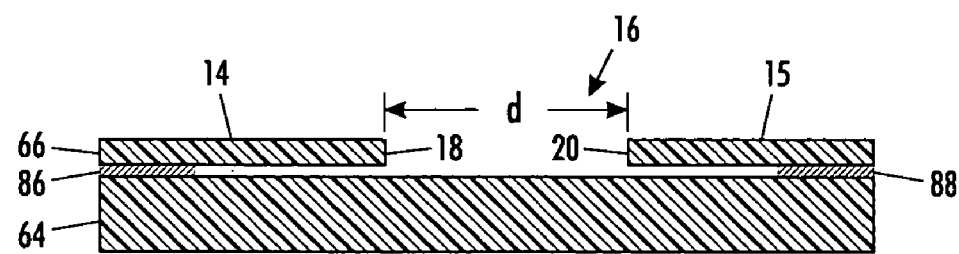

To allow movement of the waveguide elements 14, 15 relative to the substrate, all or a portion of the layer 68 may etched away. In one embodiment anchor portions 86, 88 are left, which permit limited rotation of the waveguide elements (FIG. 15).

Another method of slowly removing the sidewall matter to increase the width of the trench is wet etching of silicon using an isotropic etch, such as isotropic etching with a mixture of hydrofluoric, nitric, and acetic acids (HNA) as the etchant.

It will be appreciated that several waveguides 16 can be formed in a single microstructure using the above techniques. The waveguide can be incorporated into a device, such as a switch.

Switches can often be described as "latching" or "non-latching". A latching switch reliably remains in a known position, even if the power is removed or lost. A non-latching switch may revert to an unknown position, or even a position intermediate between switch states, when the power is lost, for example if current provided to an electromagnetic solenoid or thermal actuator is lost. One type of latching switch reverts to a known default position (state), no matter what state the switch was in when power was lost. Another type of latching switch preserves the switch state, no matter what that state was. The latter case is known as a "bi-stable" switch. The waveguide device 10 is suited to use in switches of both types.

To optimize the amount of information that can be transmitted along a single optical fiber, wavelength division multiplexers (WDMs) are designed to separate broad wavelength bands comprising many discrete narrow band optical signals (individual channels corresponding to different signal streams) into a number of predetermined narrow wavelength bands each corresponding to an individual signal channel, at designated output locations. One type of multiplexer with which the present waveguide element may be used is an add/drop multiplexer, which receives an input optical signal with many optical channels at different wavelengths from a single optical fiber. The optical signal is demultiplexed into separate optical channels based on their wavelengths. Once demultiplexed, each of the separate optical channels can either pass through the optical add/drop multiplexer to a multiplexer or be dropped. For any channel that is dropped, a new signal can be added to utilize that channel. The passed and added channels are remultiplexed into an output optical signal sent out on a single optical fiber.

Figure 16:
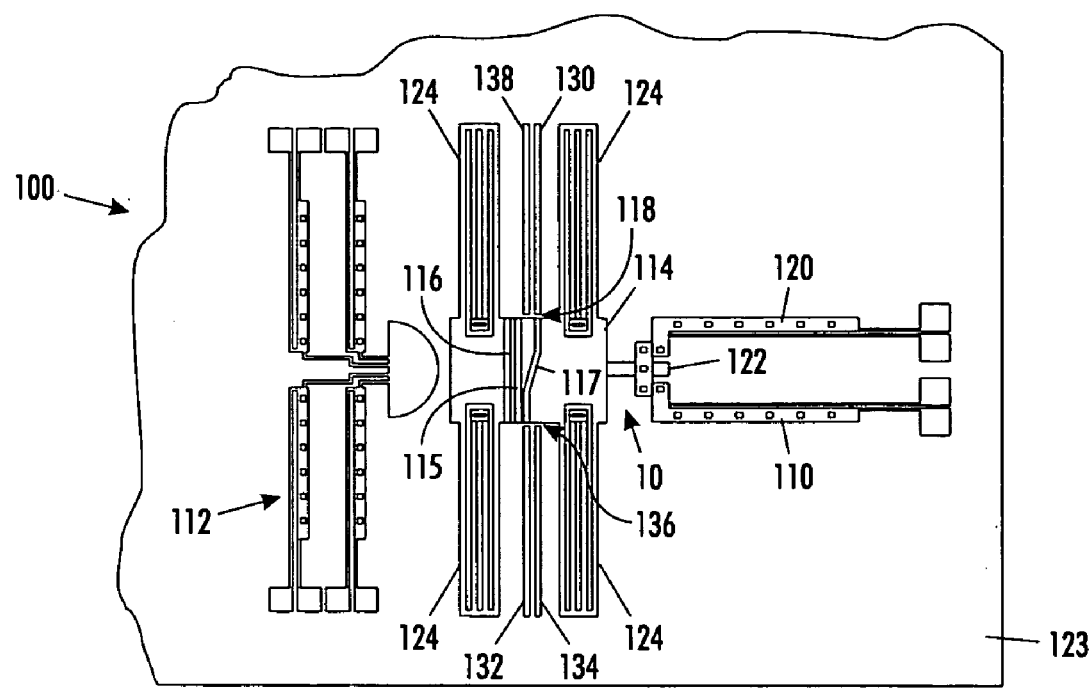
FIGS. 16–19 illustrate operation of a shuttle switch employing a waveguide device according to the disclosure.

With reference to FIGS. 16–19, a top plan view of an exemplary optical MEMS (Micro-Electro-Mechanical System) latching switch 100 employing the waveguide element 10 is shown in operation. All components shown may be fabricated in a single-crystal silicon (SCS) layer using a self-aligned process. The optical MEMS switch utilizes a latching mechanism 110 in association with an actuator or actuators 112, for aligning a moveable element, such as a waveguide shuttle 114. The movable waveguide shuttle 114 defines one or more optical waveguide elements 115, 116, 117, similar to elements 14 and 15. The actuators 112 and latching mechanism 110 may be of any suitable type, such as, for example, thermal, electrostatic or magnetic. FIG. 16 illustrates a thermal drive actuator 112. One or more of the components may be fabricated in the device layer of a silicon on insulator (SOI) wafer may be released by sacrificial etching of the buried oxide layer. In use, the optical MEMS switch 100 may be integrated with other optical components to form planar light circuits (PLCs). When switches and PLCs are integrated together on a silicon chip, compact higher functionality devices, such as Reconfigurable Optical Add-Drop Multiplexers (ROADMs), may be fabricated.

Figure 17:
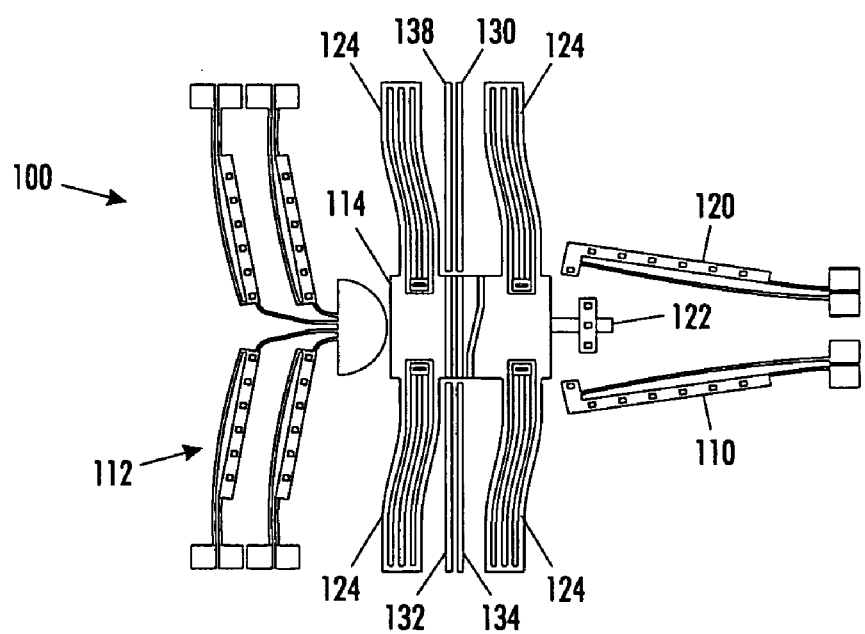

The optical switch 100 may comprise one or more of the thermal drive actuators 112, each having associated during fabrication one or more thermal latch actuators 110. The thermal latch actuator 110 includes a pair of latch teeth 120 which engage a latch member 122 on the shuttle. The movable waveguide shuttle 114 may be connected to a common substrate 123 for the device with suspension elements, shown as one or more folded springs 124. The latch teeth 120 are movable to determine one or more latched state positions wherein electrical stimuli is timed to actuate the thermal drive 112 and thermal latch actuator 110 so as to switch between equilibrium and latched states. As shown in FIGS. 16 and 17, the latch member 122 moves in an orthogonal direction with respect to the latch teeth 120.

Figure 18:
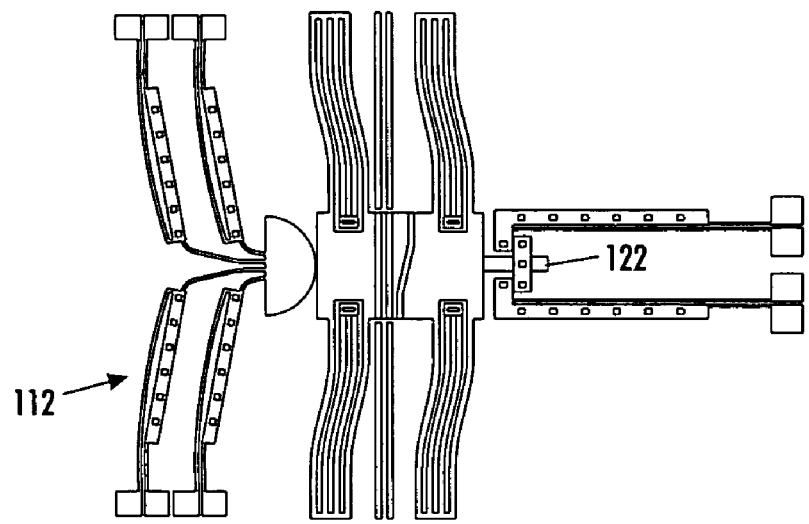
Figure 19:
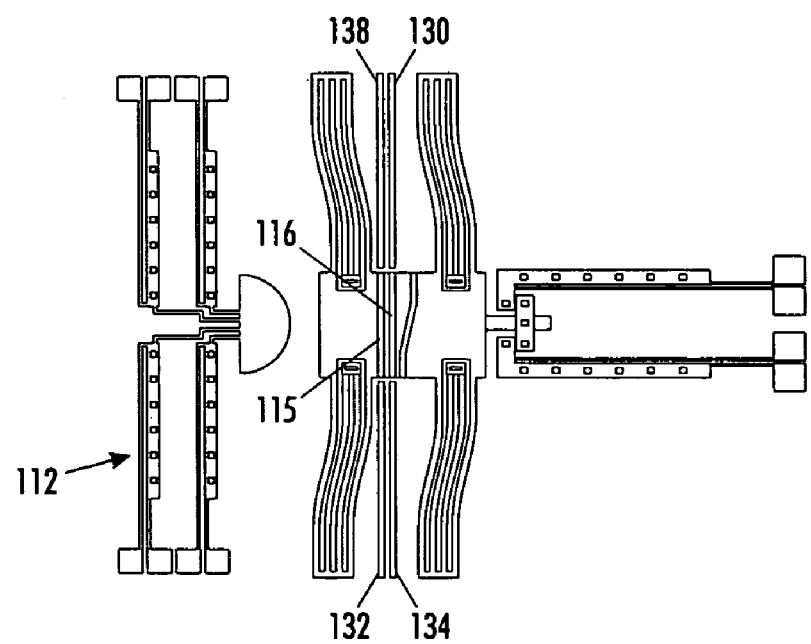

Referring once again to FIG. 16, the optical switch 100 is shown in its initial cross-state position. The thermal drive actuator(s) 112 are actuated to move the waveguide shuttle 114 to its non-equilibrium position (pass-state), while the latch teeth 120 of the thermal latch mechanism are actuated by passing current through the latch mechanism to move to the open state shown in FIG. 17. The teeth are then closed around the latching member 122 (FIG. 18). In operation, the optical switch 100 can be unlatched by passing current through the latch actuator 110, thereby opening the latch so the waveguide shuttle returns to its equilibrium position (cross-state) under the restoring force provided by the four-folded shuttle springs 124.

In the first or equilibrium position (cross-state) stationary input waveguide 130 is aligned with a first end of waveguide 117 in the shuttle and spaced therefrom by a first waveguide gap 118. Stationary output waveguide 132 is aligned with a second end of the waveguide 117 and spaced therefrom by a second waveguide gap 136, whereby signals are carried between the input and output waveguides. In the second or non-equilibrium position (pass-state) the gaps 118, 136 and waveguide device 116 in the movable shuttle connect the stationary input waveguide 130 to the stationary output waveguide 134, which in the illustrated embodiment, is a DROP waveguide. An ADD waveguide 138 is also connected to the output waveguide 132 via waveguide element 115 of the moveable shuttle across gaps 118 and 136.

While gaps 118 and 136 are each described as being a single gap, which may be formed from a laterally extending trench at the respective side of the shuttle 114, it will be appreciated that each gap 118, 136 may comprise two separately formed gaps, i.e., a separate gap adjacent the ends of each of stationary waveguide elements 130, 132, 134, and 138.

Other switches in which the waveguide device finds application are described in copending U.S. patent application Ser. No. 10/712,200, filed Nov. 12, 2003, Ser. No. 10/703,382, filed Nov. 7, 2003, and Ser. No. 10/712,203, filed Nov. 12, 2003, to Kubby, et al., U.S. Pat. Nos. 5,994,816 and 5,994,816 to Dhuler, et al., the disclosures of which are incorporated herein in their entireties by reference.

Without intending to limit the scope of the disclosure, the following example demonstrates how thermal oxidation is an effective method of controlled removal of the trench sidewall to achieve the desired gap width d.

EXAMPLE

Thermal oxidation was carried out in a furnace and showed a very robust tool for consuming the silicon. As shown in Table 1, a batch of a 25-wafer run, numbered 1 through 25, has only about 1.2% in standard deviation (0.02/0.179=1.2%). This demonstrates that use of a thermal oxidation process for controlling the silicon gap can be very reliable for submicron adjustment on silicon thickness. For each micron of grown silicon oxide, 0.44 microns of silicon are consumed.

TABLE 1

| Wafer No. | Oxide thickness (micron) | Wafer No. | Oxide thickness (micron) |
|---|---|---|---|
| 1 | 0.1789 | 14 | 0.1786 |
| 2 | 0.1773 | 15 | 0.1795 |
| 3 | 0.1773 | 16 | 0.1801 |
| 4 | 0.1791 | 17 | 0.1785 |
| 5 | 0.1791 | 18 | 0.1796 |
| 6 | 0.1782 | 19 | 0.1818 |
| 7 | 0.1803 | 20 | 0.1806 |
| 8 | 0.1798 | 21 | 0.1803 |
| 9 | 0.1797 | 22 | 0.1806 |
| 10 | 0.1787 | 23 | 0.1797 |
| 11 | 0.184 | 24 | 0.1799 |
| 12 | 0.1713 | 25 | 0.1798 |
| 13 | 0.1801 | | |
| Average | 0.179 | | |
| Std. Dev. | 0.002 | | |

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method for forming a gap comprising:
    forming sidewalls in a microstructure with a gap between the sidewalls the gap having a width between the sidewalls;
    determining the width of the gap between the sidewalls; and
    where the determined width of the gap is below selected tolerance limits for the width of the gap, consuming at least one of the sidewalls to form a gap which meets the selected tolerance limits.

2. The method of claim 1, wherein the at least one sidewall is consumed at a known rate.

3. The method of claim 1, wherein the at least one sidewall is consumed by at least one of:
    (a) oxidizing a portion of the sidewall and removing the oxidized portion; and
    (b) wet etching with an isotropic etch.

4. The method of claim 3, wherein the at least one sidewall is consumed by thermal oxidation followed by etching of oxidized material and wherein a rate of consumption of the sidewall by thermal oxidation is predetermined.

5. The method of claim 1, wherein the layer of the microstructure layer comprises primarily silicon.

6. The method of claim 1, wherein forming the sidewalls is performed by deep reactive ion etching.

7. The method of claim 1, wherein the tolerance limits are selected to provide a gap width which is defined by the expression:

$$d=d_R\pm 0.5[\lambda/4],$$

where d is the gap width,
    $d_R$ is a width of a gap at which transmission losses of an optical signal of wavelength $\lambda$ passing across the gap are at a minimum.

8. The method of claim 7, wherein one of the following conditions is satisfied:
    the wavelength $\lambda$ is about 1.5–1.6 micrometers and the tolerance limits are no greater than about ±0.20 micrometers;
    the wavelength $\lambda$ is about 1.25–1.35 micrometers and the tolerance limits are no greater than about ±0.16 micrometers.

9. The method of claim 1, wherein the gap has a width of less than 20 micrometers.

10. The method of claim 1, wherein the microstructure comprises first and second waveguide elements, each of the waveguide elements having a facet which defines one of the sidewalls.

11. A waveguide device comprising a gap formed by the method of claim 1.

12. The waveguide device of claim 11, wherein the gap width is selected to minimize transmission losses due to optical interference of an optical signal in the gap.

13. The method of claim 1, wherein the forming of sidewalls in a microstructure includes forming a trench in a layer of the microstructure.

14. A method of forming a waveguide device for transmission of an optical signal comprising:
   forming sidewalls in a microstructure, the sidewalls defining a gap therebetween having a width which is defined by the expression:

$d=d_R\pm 0.5[\lambda/4]$, where d is the width,
   $d_R$ is a width of the gap at which transmission losses of the optical signal are at a minimum, and
   $\lambda$ is a wavelength of the optical signal.

15. The method of claim 14, wherein:

$d_R=m\lambda/(2n_f)+c$, where m is an integer,
   $n_f$ is a refractive index of an optical medium in the gap, and
   c is a function of an angle of sidewalls.

16. The method of claim 13, wherein the medium is air and $d_R=m\lambda/2+c$.

17. The method of claim 14, wherein the waveguide gap width is defined in air between substantially vertical sidewalls; and $d=m\lambda/2\pm 0.5[\lambda/4]$, where m is an integer.

18. The method of claim 14, wherein the wavelength is 1.55 μm and $d=d_R\pm 0.2$ μm.

19. The method of claim 15, wherein $d=d_R\pm 0.4[\lambda/4]$.

20. A method of reducing transmission losses during transmission of an optical signal comprising:
   forming a waveguide device with at least one gap according to the method of claim 1;
   transmitting the optical signal across the gap.

21. The method of claim 20, further comprising:
   positioning the waveguide device between an input waveguide and an output waveguide whereby the optical signal is transmitted from the input waveguide to the output waveguide.

22. A method of reducing transmission losses during transmission of an optical signal comprising:
   forming a waveguide device with at least one gap according to the method of claim 14;
   transmitting the optical signal across the gap.

23. An optical latching switch comprising:
   one or more drive actuators;
   one or more latch actuators;
   a movable element which is selectively moved by said one or more drive actuators into engagement with said one or more latch actuators, said movable element including the waveguide device having at least one gap formed by the method of claim 1.

24. An optical latching switch comprising:
   one or more drive actuators;
   one or more latch actuators;
   a movable element which is selectively moved by said one or more drive actuators into engagement with said one or more latch actuators, said movable element including the waveguide device having at least one gap formed by the method of claim 14.

25. A waveguide device comprising:
   a microstructure including a gap, the gap having a width d, said width having been determined to meet the expression:

$d=d_R\pm 0.5[\lambda/4]$, where d is the gap width,
   $d_R$ is a width of a gap at which transmission losses of an optical signal of wavelength $\lambda$ passing across the gap are at a minimum.

* * * * *